United States Patent
Xi et al.

(10) Patent No.: US 10,159,933 B2
(45) Date of Patent: Dec. 25, 2018

(54) METHOD FOR PRODUCING OXIDE LAYER MATERIAL IN LANDFILL FIELD FOR TREATING METHANE GAS BY USING HOUSEHOLD REFUSE

(71) Applicant: CHINESE RESEARCH ACADEMY OF ENVIRONMENTAL SCIENCES, Beijing (CN)

(72) Inventors: Beidou Xi, Beijing (CN); Chaowei Zhu, Beijing (CN); Mingxiao Li, Beijing (CN); Yonghai Jiang, Beijing (CN); Jiaqi Hou, Beijing (CN); Yan Hao, Beijing (CN); Juan Li, Beijing (CN)

(73) Assignee: Chinese Research Academy of Environmental Sciences, Beijing (CN)

( * ) Notice: Subject to any disclaimer, the term of this patent is extended or adjusted under 35 U.S.C. 154(b) by 429 days.

(21) Appl. No.: 15/197,223

(22) Filed: Jun. 29, 2016

(65) Prior Publication Data
US 2017/0266616 A1  Sep. 21, 2017

(30) Foreign Application Priority Data
Mar. 18, 2016  (CN) .......................... 2016 1 0156640

(51) Int. Cl.
*B01D 53/06*  (2006.01)
*B01D 53/86*  (2006.01)
(Continued)

(52) U.S. Cl.
CPC ........... *B01D 53/864* (2013.01); *B01D 53/02* (2013.01); *B01D 53/0407* (2013.01);
(Continued)

(58) Field of Classification Search
CPC .......... B01D 2253/25; B01D 2253/112; B01D 53/864; B01D 53/0407; B01D 53/84;
(Continued)

(56) References Cited

PUBLICATIONS

NPL: Mechanical biological treatment of municipal solid waste, Department for Enviornment, Food and Rural Affairs, Feb. 2013 (Year: 2013).*

(Continued)

*Primary Examiner* — Melvin C. Mayes
*Assistant Examiner* — Smita S Patel
(74) *Attorney, Agent, or Firm* — Baker & Hostetler LLP

(57) ABSTRACT

The application provides an oxide layer material capable of adsorbing and degrading methane gas, which is obtained by a method comprising the steps of: 1) subjecting a cracked household refuse to aerobic biological pretreatment; 2) subjecting the material which has been subjected to the aerobic biological pretreatment to biological stabilizing treatment; and 3) adding copper chloride, potassium sulfate, magnesium oxide, and a composite bacterial agent for oxidizing methane gas to the material which has been subjected to the biological stabilizing treatment to obtain the oxide layer material capable of adsorbing and degrading methane gas. This disclosure further discloses a method for preparing the oxide layer material capable of adsorbing and degrading methane gas described above.

3 Claims, 1 Drawing Sheet

(51) Int. Cl.
- *B01D 53/04* (2006.01)
- *B01D 53/84* (2006.01)
- *B01J 31/00* (2006.01)
- *B01J 31/28* (2006.01)
- *B01J 37/02* (2006.01)
- *B01J 20/04* (2006.01)
- *B01D 53/02* (2006.01)
- *B01D 53/85* (2006.01)
- *B01J 20/02* (2006.01)
- *B01J 37/36* (2006.01)

(52) U.S. Cl.
CPC .............. *B01D 53/84* (2013.01); *B01D 53/85* (2013.01); *B01J 20/0237* (2013.01); *B01J 20/041* (2013.01); *B01J 20/045* (2013.01); *B01J 31/003* (2013.01); *B01J 31/28* (2013.01); *B01J 37/0215* (2013.01); *B01D 2251/95* (2013.01); *B01D 2253/112* (2013.01); *B01D 2253/25* (2013.01); *B01D 2257/7025* (2013.01); *B01D 2258/02* (2013.01); *B01D 2258/0283* (2013.01); *B01D 2259/4591* (2013.01); *B01J 37/36* (2013.01); *Y02A 50/2358* (2018.01); *Y02A 50/2359* (2018.01); *Y02C 20/20* (2013.01)

(58) Field of Classification Search
CPC ........ B01D 53/02; B01D 53/85; B01D 53/86; B01D 53/04; B01D 2257/7025; B01D 2258/02; B01D 2259/4591; B01D 2251/95; B01J 31/003; B01J 31/28; B01J 31/00; B01J 37/00; B01J 37/36; B01J 37/0215; B01J 37/02; B01J 20/041; B01J 20/045; B01J 20/0237; Y02A 50/2358; Y02A 50/2359

See application file for complete search history.

(56) References Cited

PUBLICATIONS

CN101412033, Ruo et al, Machine translation, published on Apr. 2009 (Year: 2009).*

* cited by examiner

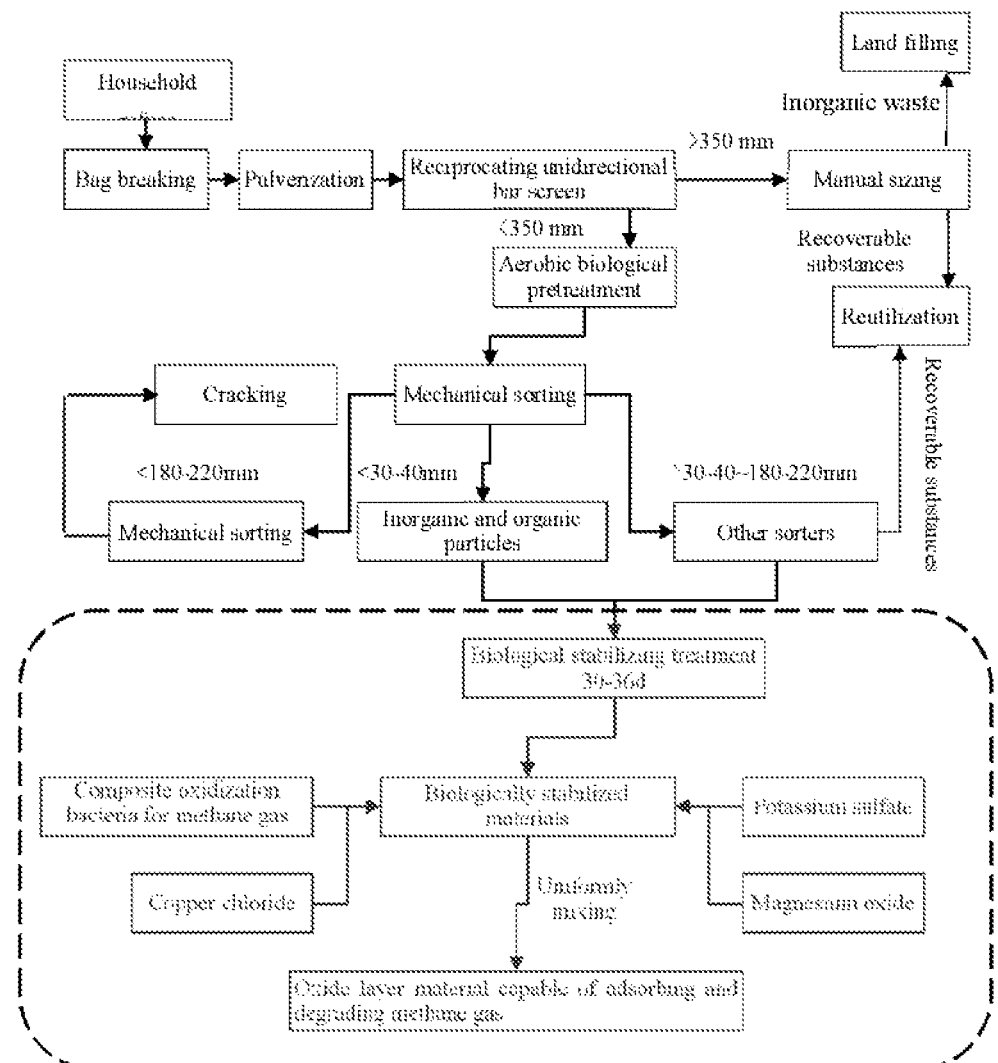

METHOD FOR PRODUCING OXIDE LAYER MATERIAL IN LANDFILL FIELD FOR TREATING METHANE GAS BY USING HOUSEHOLD REFUSE

FIELD OF THE INVENTION

This disclosure pertains to the field of household refuse treatment, and particularly to an oxide layer material capable of adsorbing and degrading methane gas used for landfill fields.

This disclosure also relates to a method for preparing the oxide layer material capable of adsorbing and degrading methane gas described above by using household refuse.

This disclosure also relates to use of the oxide layer material capable of adsorbing and degrading methane gas described above.

BACKGROUND OF THE INVENTION

In recent decades, global climate change and ecological problems caused by the greenhouse effect have become a serious threat. Methane gas is an important greenhouse gas, and its temperature-increasing efficiency is 21 times that of carbon dioxide. According to statistics, the overall contribution of methane gas to the global greenhouse effect is up to 22%, and methane gas is a greenhouse gas which has the fastest annual increase rate.

As the population and economic and living levels continuously increase, the production amount of household refuse also increases rapidly. Refuse landfill is an important technical means for treating household refuse in a few countries (particularly developing countries). In a long-term anaerobic environment, household refuse in landfill fields will generate a large amount of landfill gas with methane as a main component. Indeed, household refuse landfill fields have also become one of the important sources which emit methane gas. It is reported that the amount of methane gas emitted from refuse landfill fields is 20-70 Tg·a$^{-1}$, and the proportion accounting for the total amount of global methane gas emission has been increased to 12%-20%. Therefore, the reduction of methane gas emission in household refuse landfill fields is an important task for every country in the world to control and reduce global greenhouse gas emission.

At present, landfill gas collection and utilization systems are generally provided in large household refuse landfill fields, and they may effectively utilize the landfill gas released from household refuse landfill fields and reduce the emission of methane gas. However, the landfill gas collection and utilization system is complex for installation and has high manufacture cost. Since the gas generation intensity of methane gas is low for middle and small household refuse landfill fields, the collection system has low efficiency and it is difficult to ensure normal operation of the landfill gas utilization system. Therefore, the landfill gas collection and utilization systems are not suitable for the middle and small household refuse landfill fields. How to effectively control the emission of landfill gas in the middle and small refuse landfill fields (without landfill gas collection and utilization systems) is a commonly concerned challenge at present in the field of environmental protection.

SUMMARY OF THE INVENTION

An object of this disclosure is to provide an oxide layer material capable of adsorbing and degrading methane gas used for landfill fields.

Another object of this disclosure is to provide a method for preparing the oxide layer material described above.

In order to achieve the object described above, the oxide layer material capable of adsorbing and degrading methane gas provided by this disclosure is obtained by a method comprising the steps of:

1) subjecting a cracked household refuse to aerobic biological pretreatment;

2) subjecting the material which has been subjected to the aerobic biological pretreatment to biological stabilizing treatment; and 3) adding copper chloride, potassium sulfate, magnesium oxide, and a composite bacterial agent for oxidizing methane gas to the material which has been subjected to the biological stabilizing treatment to obtain the oxide layer material capable of adsorbing and degrading methane gas.

In the oxide layer material capable of adsorbing and degrading methane gas, the material which has been subjected to the aerobic biological pretreatment is screened before being subjected to the biological stabilizing treatment.

In the oxide layer material capable of adsorbing and degrading methane gas, in the total materials of step 3), the addition amount of copper chloride is 3-6 mg per kg of the total materials, the addition amount of potassium sulfate is 0.01-0.06 g per kg of the total materials, the addition amount of magnesium oxide is 0.01-0.02 g per kg of the total materials, the volume ratio of MIp1:MIp2:MIIO1:MIIO2 in the composite bacterial agent for oxidizing methane gas is 1-2:2-3:2-3:1-2, and the inoculation amount of the composite bacterial agent for oxidizing methane gas is 0.1-0.8% by mass fraction on a wet basis of the total materials.

The method for preparing the oxide layer material capable of adsorbing and degrading methane gas described above provided by this disclosure comprising the steps of:

1) subjecting a cracked household refuse to aerobic biological pretreatment;

2) subjecting the material which has been subjected to the aerobic biological pretreatment to biological stabilizing treatment; and 3) adding copper chloride, potassium sulfate, magnesium oxide, and a composite bacterial agent for oxidizing methane gas to the material which has been subjected to the biological stabilizing treatment to obtain the oxide layer material capable of adsorbing and degrading methane gas.

In the preparation method, the material which has been subjected to the aerobic biological pretreatment is screened before being subjected to the biological stabilizing treatment.

In the preparation method, in the total materials of step 3), the addition amount of copper chloride is 3-6 mg per kg of the total materials, the addition amount of potassium sulfate is 0.01-0.06 g per kg of the total materials, the addition amount of magnesium oxide is 0.01-0.02 g per kg of the total materials, the volume ratio of MIp1:MIp2:MIIO1:MIIO2 in the composite bacterial agent for oxidizing methane gas is 1-2:2-3:2-3:1-2, and the inoculation amount of the composite bacterial agent for oxidizing methane gas is 0.1-0.8% by mass fraction on a wet basis of the total materials.

The oxide layer material capable of adsorbing and degrading methane gas prepared in this disclosure is used as a covering layer for a landfill field by adding and uniformly mixing the oxide layer material capable of adsorbing and degrading methane gas at 0.3-0.8% by mass fraction on a wet basis to an oxide layer material for methane gas.

After the oxide layer material capable of adsorbing and degrading methane gas prepared by using this disclosure is uniformly mixed with a typical oxide layer material for methane gas and is used as a covering layer for a landfill field, the rate of adsorption and degradation of methane gas in the landfill field can be up to 18-30 $CH_4/m^2 \cdot h$. This material has good effect in the use of the middle and small refuse landfill fields which have smaller gas generation amount, and may substantially achieve 90% or more of landfill gas reduction. It may be compared with the data that the rate of adsorption and degradation of methane gas in the landfill field is 2.5-12 L $CH_4/m^2 \cdot h$ with respect to a commonly used oxide layer material for methane gas.

BRIEF DESCRIPTION OF THE DRAWINGS

FIG. 1 is a process flow chart of this disclosure.

DETAILED DESCRIPTION OF THE INVENTION

This disclosure uses landfill waste—household refuse in landfill fields as main raw materials to produce environmentally friendly products which may reduce the emission of methane gas in landfill fields, and converts household refuse to a material capable of adsorbing and degrading methane gas. The preparation method of this disclosure comprises the techniques, such as a biological pretreatment technique, a mechanical sorting pretreatment technique, an aerobic biological stabilizing technique, and landfill field methane gas oxide layer materials, or the like.

The biological pretreatment technique described above means that the household refuse is subjected to biological pretreatment after initial cracking. The household refuse is firstly treated by a bag-breaking machine and a cracking machine, and large-piece refuse separation and conveying is performed with a reciprocating unidirectional bar screen.

According to specification requirements for raw materials of products, the reciprocating unidirectional bar screen described above has a bar pitch set to be 350 mm, a reciprocating amplitude of ±250 mm, and a frequency of 8-10 times/min.

The separation and conveying described above means that the refuse with diameters greater than 300 mm after sorting is manually sorted to obtain useful substances, and the remnants, which are substantially inert substances, may be delivered to a landfill field for treatment. Materials smaller than 300 mm are passed into a working section of aerobic biological pretreatment.

The total period of the working section of the aerobic biological pretreatment described above is 12 d. In the first 5 d, ventilation is performed for 10 min for 6 times per day; in the following 5 d, the stacking temperature may be up to 60° C. or more, and ventilation is performed for 15 min and is stopped for 40 min; and in the last 2 d of the treatment, ventilation is performed for 15 min and is stopped for 30 min, while turning and throwing are performed 1-2 times per week. Weight reduction, dehydration, and conveying of materials are achieved by using a dynamic windrow type biological fermentation process which combines negative-pressure ventilation and oxygen supplying with turning and throwing.

In the aerobic biological pretreatment described above, the stacking height for fermentation is 1.5-2.2 m, the initial water content rate of the materials is typically 55-65%, the wind amount is 0.15-0.25 $m^3/min \cdot m^3$, the wind pressure is 3,600-4,200 Pa, and the layer pressing is ensured at a layer stacking of 1,200-1,500 Pa/m. This process may well improve the properties of the materials, and may reduce the water content rate of the materials, the viscosity, and twisting degree between materials. The object thereof is to improve the efficiency of mechanical sorting.

In the mechanical sorting pretreatment technique, the sieve pores of a drum screen employ a larger and a smaller pore size specifications according to specification requirements for raw materials for production. Here, the smaller pore size is 30-40 mm, the larger pore size is 180-220 mm, the drum has a feed port with a height of 3.0-3.3 m and a discharge port with a height of 1.8-2.0 m, and the rotational speed is about 15-20 r/min (particular parameters may be finely tuned according to practical situations).

A cutting knife is provided in the drum screen described above, and according to particle sizes, the refuse may be divided by the drum screen into three groups, which have a particle size less than Φ40 mm, a particle size of Φ40-200 mm, and a particle size greater than Φ200 mm (descriptions are made by exemplifying a smaller pore size of 40 mm and a larger pore size of 200 mm below).

The refuse having a particle size less than Φ40 mm described above may be directly delivered to a subsequent working section of biological stabilizing treatment.

After the utilizable components, such as plastic, metal, paper, etc., are recovered by manual sorting or other sorting apparatuses, such as blowing sorting, magnetic sorting, etc., and it is ensured that the materials in this specification are substantially fermentable organic materials, the materials having a particle size of Φ40-200 mm described above which pass through the drum screen are delivered to the working section of biological stabilizing treatment and are mixed with the materials having a particle size less than Φ40 mm, and fermentation is performed.

The refuse having a particle size greater than Φ200 mm described above, which passes through the drum screen, is pulverized, and is then returned to the drum screen for sorting. After sorting, this cycle is performed according to particle sizes to ensure an optimal effect of sorting and obtain raw materials for production reaching to the standard, and at the meanwhile, the maximization of the sorting efficiency of recoverable substances is achieved.

The materials after the mechanical sorting are subjected to a process of a third section: the biological stabilizing treatment. The biological stabilizing treatment employs a tank-type reactor as a fermentation cabin and employs a manner of batch air-blowing type oxygen supply. Since the biochemical oxygen demand is reduced after the materials are subjected to biological pretreatment, the ventilation amount is further reduced such that the wind amount is 0.15-0.20 $m^3/min \cdot m^3$, the wind pressure is 3,600 Pa, and the layer stacking is 1,200 Pa/m.

In the biological stabilizing treatment described above, the frequencies of ventilation are as follows: ventilation is performed 6 times per day in a temperature increasing period and 10 min for each time; ventilation is performed for 15 min and is stopped for 40 min in a high temperature period; and ventilation is performed for 15 min and is stopped for 30 min in a temperature decreasing period.

The period of the biological stabilizing treatment described above is about 30-36 days.

The materials after the biological stabilizing treatment are subjected to a process of a fourth section: the production of the oxide layer material for methane gas from landfill field. That is, in a typical oxide layer material for methane gas, the materials prepared in this disclosure after the biological stabilizing treatment is added at 0.3-0.8% (mass fraction on a wet basis), and at the meanwhile, copper chloride, potassium sulfate, magnesium oxide, and a composite bacterial agent for oxidizing methane gas are added proportionally. They are uniformly mixed to be used as an overlaying material for refuse dumps. It is also possible to proportionally add copper chloride, potassium sulfate, magnesium oxide, and a composite bacterial agent for oxidizing methane gas to the materials subjected to the biological stabilizing treatment and then to mix it with a typical oxide layer material for methane gas.

In the composite bacterial agent for oxidizing methane gas described above, the main strains include: MIp1 (*Methylomonas*), MIp2 (*Methylococcus*), MIIO1 (*Methylocys-taceae*), and MIIO2 (*Methylocys-taceae*).

In the composite bacterial agent for oxidizing methane gas described above, the optimal proportion and the inoculation amount are MIp1:MIp2:MIIO1:MIIO2=1-2:2-3:2-3: 1-2 by volume ratio; and the inoculation amount is 0.1-0.8% (mass fraction on a wet basis).

The additives for the oxide layer material for methane gas are copper chloride, potassium sulfate, and magnesium oxide, and the addition proportions are respectively, copper chloride: 3-6 mg per kg of culture medium; potassium sulfate: 0.01-0.06 g per kg of culture medium; and magnesium oxide: 0.01-0.02 g per kg of culture medium.

The optimal embodiments of this disclosure are set forth below in conjunction with the accompanying drawing.

In conjunction with FIG. 1, it is a process flow chart of this disclosure.

700 kg of household refuse, which is used as a raw material, is firstly treated by a bag-breaking machine and a cracking machine, and large-piece refuse separation and conveying is performed with a reciprocating unidirectional bar screen (the reciprocating unidirectional bar screen described above has a bar pitch set to be 350 mm, a reciprocating amplitude of ±250 mm, and a frequency of 10 times/min). Refuse with diameters greater than 300 mm after sorting is manually sorted to obtain useful substances, and the remnants, which are substantially inert substances, may be delivered to a landfill field for treatment. Materials smaller than 300 mm are passed into a working section of aerobic biological pretreatment. The total period of the working section of aerobic biological pretreatment is 12 d. In the first 5 d, ventilation is performed for 10 min for 6 times per day; in the following 5 d, the stacking temperature may be up to 60° C. or more, and ventilation is performed for 15 min and is stopped for 40 min; and in the last 2 d of the treatment, ventilation is performed for 15 min and is stopped for 30 min, while turning and throwing are performed twice per week. Meanwhile, during the aerobic biological pretreatment, the stacking height for fermentation is 2 m, the initial water content rate of the materials is typically 55-65%, and the wind amount is 0.20 m$^3$/min·m$^3$, the wind pressure is 4,000 Pa. The refuse after aerobic biological pretreatment is passed through a drum screen for mechanical sorting. Sieve pores of the drum screen employ a larger and a smaller pore size specifications, wherein the smaller pore is 35 mm, the larger pore is 200 mm, the drum has a feed port with a height of 3.0 m and a discharge port with a height of 2.0 m, and the rotational speed is about 20 r/min. The refuse which passes through the drum screen may be divided by a cutting knife provided in the drum screen into three groups, which have a particle size less than Φ40 mm, a particle size of Φ40-200 mm, and a particle size greater than Φ200 mm. The refuse having a particle size less than Φ40 mm is directly subjected to a subsequent working section of biological stabilizing treatment. After the utilizable components, such as plastic, metal, paper, etc., are recovered by manual sorting or other sorting apparatuses, such as blowing sorting, magnetic sorting, etc., and it is ensured that the materials in this specification are substantially fermentable organic materials, the materials having a particle size of Φ40-200 mm which pass through the drum screen are delivered to the working section of biological stabilizing treatment and are mixed with the materials having a particle size less than Φ40 mm, and fermentation is performed. The refuse having a particle size greater than Φ200 mm, which passes through the drum screen, is pulverized, and is then returned to the drum screen for sorting. After sorting, this cycle is performed according to particle sizes. The materials after mechanical sorting are passed to a biological stabilizing treatment. The biological stabilizing treatment employs a tank-type reactor as a fermentation cabin and employs a manner of batch air-blowing type oxygen supply. The ventilation amount is 0.20 m$^3$/min·m$^3$, the wind pressure is 3,600 Pa, and the layer stacking is 1,200 Pa/m. The frequencies of ventilation are as follows: ventilation is performed 6 times per day in a temperature increasing period and 10 min for each time; ventilation is performed for 15 min and is stopped for 40 min in a high temperature period; and ventilation is performed for 15 min and is stopped for 30 min in a temperature decreasing period. Biological stabilizing treatment has a period of 30 d. The materials after biological stabilizing treatment at 0.5% (mass fraction on a wet basis) are added to an oxide layer material for methane gas. At the meanwhile, a composite bacterial agent for oxidizing methane gas of MIp1 (*Methylomonas*), MIp2 (*Methylococcus*), MIIO1 (*Methylocys-taceae*), and MIIO2 (*Methylocys-taceae*) is added, wherein the volume ratio is 2:2:2:1 and the inoculation amount is 0.5% (mass fraction on a wet basis). At the meanwhile, copper chloride, potassium sulfate, and magnesium oxide are added to enhance the degradation effect of mutagenized engineering bacteria and prevent functional deterioration, such that the proportions of trace elements in materials are improved. the addition proportions are copper chloride: 5 mg/kg per kg of culture medium; potassium sulfate: 0.05 g per kg of the total materials; and magnesium oxide: 0.02 g per kg of the total materials.

The overlaying material produced by fully and uniformly mixing provides a high-efficiency biological oxidation to methane, which may achieve a methane oxidation rate of up to 64.5-78.74% in 6 d and substantially near to 100% in 18 d. As can be seen, this disclosure can remarkably adsorb and degrade methane gas.

What is claimed is:

1. A preparation method for an oxide layer material capable of adsorbing and degrading methane gas comprising the steps of:
    1) subjecting a material comprising a cracked household refuse to aerobic biological pretreatment;
    2) subjecting the material which has been subjected to the aerobic biological pretreatment to biological stabilizing treatment; and
    3) adding copper chloride, potassium sulfate, magnesium oxide, and a composite bacterial agent for oxidizing methane gas including MIp1 (*Methylomonas*), MIp2 (*Methylococcus*), MIIO1 (*Methylocys-taceae*), and MIIO2 (*Methylocys-taceae*) to the material which has been subjected to the biological stabilizing treatment to obtain the oxide layer material capable of adsorbing and degrading methane gas.

2. The preparation method according to claim 1, wherein the material which has been subjected to the aerobic biological pretreatment is screened before being subjected to the biological stabilizing treatment.

3. The preparation method according to claim 1, wherein in the total materials of step 3, the addition amount of copper chloride is 3-6 mg per kg of the total materials, the addition amount of potassium sulfate is 0.01-0.06 g per kg of the total materials, the addition amount of magnesium oxide is 0.01-0.02 g per kg of the total materials, the volume ratio of MIp1:MIp2:MIIO1:MIIO2 in the composite bacterial agent for oxidizing methane gas is 1-2:2-3:2-3:1-2, and the inoculation amount of the composite bacterial agent for oxidizing methane gas is 0.1-0.8% by mass fraction on a wet basis of the total materials.

* * * * *